(12) United States Patent
Hoffman

(10) Patent No.: US 6,532,865 B1
(45) Date of Patent: Mar. 18, 2003

(54) FOOD COOKING VESSEL

(76) Inventor: Nathan Hoffman, 3231 N. 1-10 Service Rd., Metairie, LA (US) 70002

( * ) Notice: Subject to any disclaimer, the term of this patent is extended or adjusted under 35 U.S.C. 154(b) by 0 days.

(21) Appl. No.: 10/036,136

(22) Filed: Nov. 9, 2001

(51) Int. Cl.[7] .............................. A23L 1/00; A47J 27/00; A47J 27/04
(52) U.S. Cl. ............................. 99/407; 99/410; 99/415; 99/418; 222/185.1; 251/144
(58) Field of Search .......................... 99/340, 336, 403, 99/407, 410, 415, 418; 137/801; 251/144; 222/185.1; 220/529, 912, 913, 573.4, 573.1

(56) References Cited

U.S. PATENT DOCUMENTS

| | | | | |
|---|---|---|---|---|
| 1,272,222 A | * | 7/1918 | Clayton | 99/418 |
| 1,445,788 A | * | 2/1923 | Millican | 99/418 |
| 1,469,512 A | * | 10/1923 | Hutchison | 222/185.1 |
| 6,446,545 B2 | * | 9/2002 | Rigney | 99/340 X |

* cited by examiner

*Primary Examiner*—Reginald L. Alexander
(74) *Attorney, Agent, or Firm*—Keaty Professional Law Corporation

(57) ABSTRACT

A food-cooking vessel has a bottom plate and an upwardly extending continuous sidewall. A spigot assembly is secured to the sidewall above the bottom plate to allow draining of liquid from the vessel. A valve mounted in the spigot assembly regulates the flow of liquid from the vessel to an outlet spout. A filter is mounted in the spout to filter solid particles from the drained liquid. The spigot assembly has an attachment plate that is fixedly secured on the convex exterior surface of the sidewall surrounding a drain opening formed in the sidewall. A cylindrical attachment member is fixedly attached to the plate and extends through the plate into the drain opening without contacting the wall of the container, thereby avoiding the necessity of having the cylindrical member to conform to the convex wall of the vessel.

2 Claims, 2 Drawing Sheets

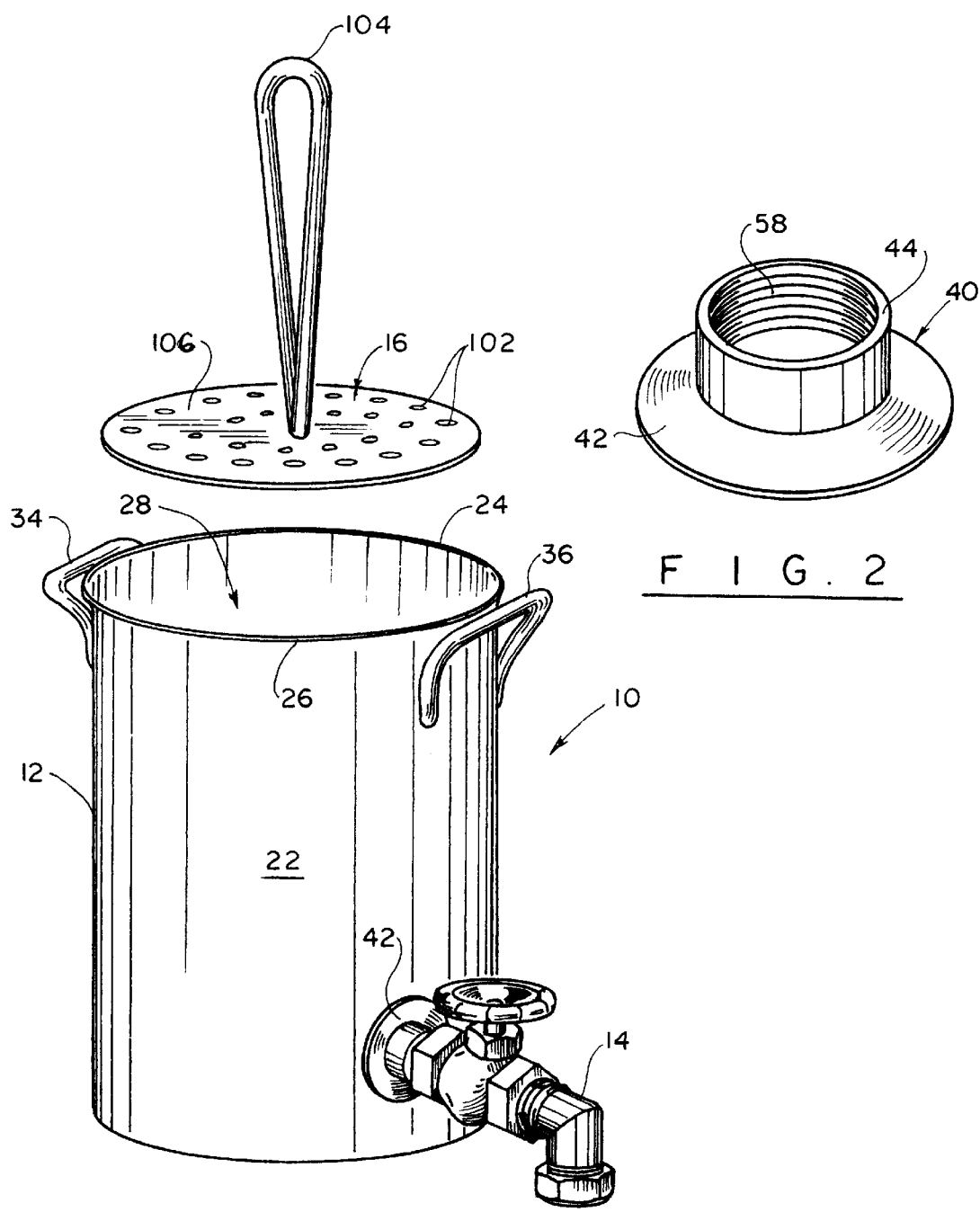

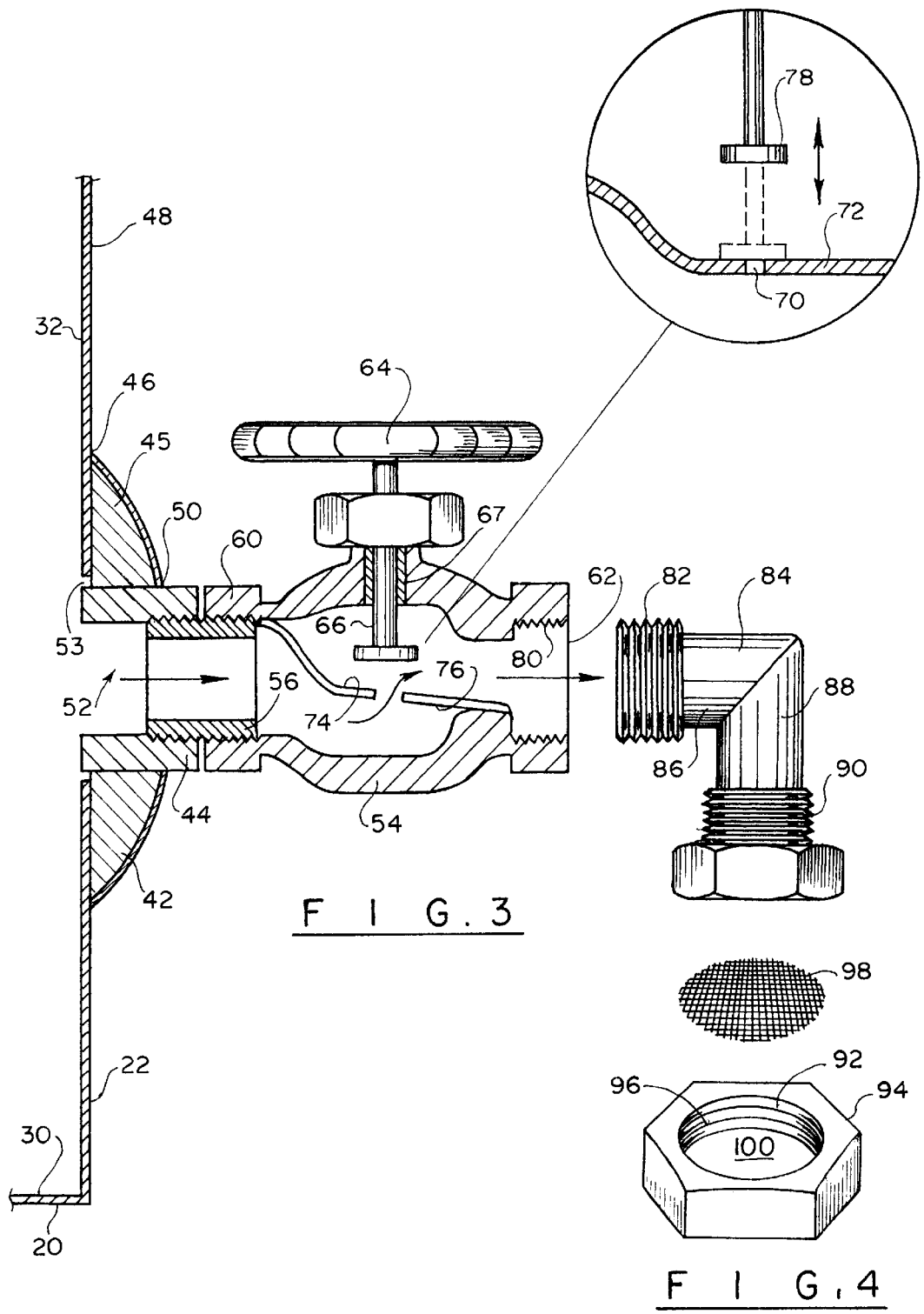

FOOD COOKING VESSEL

BACKGROUND OF THE INVENTION

This invention relates to cooking vessels, and more particularly to a cooking apparatus designed for deep-frying, steaming, or boiling food items.

Cooking pots and kettles have long been used for both commercial and home food preparation. They differ in size, materials, and sometimes—their intended purposes. Some of the devices are particularly adapted for boiling foods, others for deep-frying, etc. Larger cooking pots and kettles can accommodate whole cuts of meat, fowl or poultry. The food industry provides also for a special type of vessel, the so-called "turkey fryer," which is spacious enough to accommodate a whole bird.

Conventional turkey fryers are made from a relatively thick metal plate capable of withstanding elevated temperatures, oftentimes higher than 350 degrees Fahrenheit, particularly when a food item is deep fried in hot oil. The "turkey fryers" can also be used for frying other foods, such as fish, meats, and vegetables, as well as serve as steaming and boiling pots. In effect, these large vessels are multi-functional cooking systems.

One of the concerns when frying solid foods is that small particles of food dislodge from the larger segment of food; these small particles become heated in the frying oil much faster than the larger item. Therefore, when the frying vessel contains a large item, which takes longer to cook and small particles, which are heated relatively quickly, the smaller particles become burnt while the larger item is barely cooked.

Due to the turbulence of the oil being boiled in the cooking vessel, these burnt particles become suspended in oil and, when the main food item is taken out of the vessel, the smaller particles remain in the vessel. The burnt particles eventually settle toward the bottom of the vessel. It is conventional to re-use the frying oil. However, when the oil contains a large amount of burnt solid pieces, the oil not only loses its aesthetic appeal—it may become dangerous to reuse.

An additional concern is the presence of seasoning agents that are added to the oil when frying the whole bird. These seasonings also become suspended in the oil; they have to be filtered out before oil may be re-used.

When a considerable amount of oil in a large "turkey fryer" has to be disposed of, it becomes an arduous task because of the weight of the vessel and the oil contained therein. While the turkey fryer cooking vessels have relatively high walls to prevent splattering of bubbling oil, they are awkward to handle and difficult to tip to pour out the used oil. The conventional turkey fryers have no means of draining the liquid contents of the vessel. The user usually has to pour out the liquid from the top of the container, which may be dangerous if the oil is still hot.

One of the conventional approaches may provide for the use of a hand pump to pump out the oil from the frying vessel. However, these hand pumps are usually cumbersome and difficult to use without splattering oil around the fryer.

The present invention contemplates provision of a food-cooking vessel that can be used as a multi-functional cooking apparatus while allowing draining of liquid from the vessel while at the same time filtering the liquid.

SUMMARY OF THE INVENTION

It is, therefore, an object of the present invention to provide a food-cooking vessel that may be used for cooking large quantities of food.

It is another object of the present invention to provide a food preparation vessel that can be used as a multi-functional cooking system.

It is a further object of the present to provide a food-cooking vessel that will allow draining of the liquid from the vessel while filtering the liquid.

These and other objects of the present invention are achieved through a provision of a generally cylindrical container provided with a spigot assembly with a filter for filtering drained liquids. The spigot assembly is secured on the sidewall of the container above the bottom plate.

The spigot assembly comprises an attachment member that is welded to the container wall around the drain opening in the wall. The attachment member comprises a convex plate and a cylindrical portion fixedly attached to the plate. The cylindrical portion extends through the central opening of the plate into the drain opening of the container. The cylindrical portion does not contact the container wall, thereby avoiding the necessity of welding a straight edge to an outwardly convex container wall.

The spigot assembly comprises a valve operated by a handle to allow draining of the liquid from the container. An inline filter assembly is positioned downstream from the valve to filter out burnt particles and added seasonings. The filter, as well as the valve member may be removed for cleaning.

BRIEF DESCRIPTION OF THE DRAWINGS

Reference will now be made to the drawings, wherein like parts are designated by like numerals and wherein:

FIG. 1 is a perspective view of the food-cooking vessel in accordance with the present invention.

FIG. 2 is a detail view of the spigot-securing member of the present invention.

FIG. 3 is a detail, partially cross-sectional view of the spigot assembly of the present invention secured on the wall of the cooking vessel.

FIG. 4 is an exploded view of the filter and filter holder for use in the apparatus of the present invention.

DETAILED DESCRIPTION OF THE PREFERRED EMBODIMENT

Turning now to the drawings in more detail, numeral 10 designates the food preparation vessel in accordance with the present invention. The vessel 10 comprises a generally cylindrical container 12 and a spigot assembly 14 secured on the wall of the container 12. An optional food support plate 16 may be provided for positioning food items thereon and easy removal of the food items from the container 12.

The container 12 has a bottom plate 20 (FIG. 3) and a continuous sidewall 22 fixedly attached at a right angle to the bottom plate 20. The wall 22 extends upwardly from the bottom plate 20 to the top edge 24, which may be provided with an outwardly extending lip 26.

A cooking chamber 28 is defined between the inner surface 30 of the bottom plate 20 and the interior wall 32 of the sidewall 22. The chamber 28 is large enough to accommodate a food item and cooking liquid, be it oil, water, or broth. A pair of handles 34 and 36 are secured below the top edge 24 on diametrically opposite sides of the sidewall 22.

Fixedly attached to the wall 22 is the spigot assembly 14. The assembly 14 comprises an attachment member 40, which is comprised of a plate 42 and a cylindrical attachment member, or nipple 44 inserted through a central opening formed in the plate 42. The attachment plate 42 is an outwardly convex plate with a circumferential outer edge 46. The edge 46 is adapted for attachment, such as by welding, to the exterior surface 48 of the wall 22. Of course, the plate 42 may have a frustoconical configuration, if desired, allowing an apex 50 of the plate 42 to extend outwardly from the exterior service 48 of the wall 22.

A drain opening 52 is formed in the wall 22 above the bottom plate 20. The plate 42 surrounds the opening 52 while allowing the cylindrical portion 44 to extend into the opening 52 without contacting the wall 22, as shown in more detail in FIG. 3. The circumferential edge 46 of the plate 42 is easily conformed to the exterior surface of the container 12.

The exterior diameter of the portion 44 is smaller than the diameter of the drain opening 52. Consequently, an annular gap 53 is formed between the wall 22 and the portion 44. The space between the plate 42 and the wall 22 is filled with the welding medium 45, which when in a hot state, configures itself to the exterior convex surface of the wall 22. The welding medium 45 in effect creates a web that supports the plate 42 and the nipple 44 on the wall 22 allowing for contraction and expansion when the container 12 is heated and cooled.

In this manner, the cylindrical portion 44 does not have to conform to the arcuate wall 22. This arrangement allows a secure attachment of the spigot assembly 14 to the cylindrical, outwardly convex wall 22 of the container 12 avoiding a possible weak connection of the spigot assembly 14 to the container 12.

An additional consideration that taken into account when attaching the spigot assembly 14 to the container 12 is the physical response of the metal to heating and cooling. The expansion and contraction characteristics of the metal container 12 and the spigot assembly 14 may not be similar If there is no gap 53 between the container wall 22 and the attachment member 44, the connection between these two elements may be weakened when the vessel is heated and then cooled. The gap 53 "takes up" some of the physical load in the area of attachment of the spigot assembly 14 to the wall 22.

The spigot assembly 14 further comprises a valve member 54 secured to the cylindrical portion 44 of the attachment member 40. A coupler 56 is threadably detachably engaged with the interior threads 58 of the cylindrical portion 44 and the interior threads of an inlet end 60 of the valve member 54. The opening 52, the cylindrical portion 44, and the valve member 54 have coaxial openings allowing the flow of liquid from the opening 52 to an outlet end 62 of the valve member 54.

The valve member 54 is provided with a rotatable handle 64 that has a valve stem 66 secured thereto. A heat-resistant gasket 67 surrounds the valve stem 66 and prevents leakage of oil through the opening made for the valve stem. The valve stem 66 moves up and down, as shown in the detailed view of FIG. 3, opening and closing a valve opening 70 to allow passage of liquid from the drain opening 52 to the outlet end 62. A valve seat 72 is comprised of two independent members 74 and 76.

The valve opening 70 is formed between the members 74 and 76 in a vertical alignment with the stem 66 and the valve plate 78. The valve plate 78 is a generally circular plate large enough to cover the opening 70 and block a passageway of liquid from the container 12 through the spigot assembly 14. The valve plate 78 and the valve seat members 74 and 76 may be made from heat-resistant plastic suitable to withstand boiling temperatures of the drained liquid through multiple drain cycles. The valve plate 78 and the valve seat members 74, 76 do not lose their resilience even after multiple uses of the container 12.

The valve member 54 is provided with internal threads 80 in the outlet end 62. The internal threads 80 are adapted to matingly engage external threads 82 of a spout member 84. The spout member 84 has an inlet end 86 where the threads 82 are located and an outlet end 88, which is similarly provided with external threads 90. If desired, the portions 86 and 88 may be oriented at an angle in relation to each other to allow downward extension of the spout outlet 88 to ease draining of liquid form the container 12.

The external threads 90 of the outlet portion 88 are adapted to matingly engage with.the internal threads 92 of a filter holder 94. The filter holder 94 may be configured as a hexagonal nut, or a ring-shaped member or other suitable element provided an inwardly extending flange 96 for supporting a filter 98 thereon.

The filter 98 is a circular filter configured to fit into an opening 100 formed in the filter holder 94. The filter 98 is a fine mesh filter that is made of a strong non-corrosive material, such as stainless steel and the like, to allow multiple uses of the filter when draining the container 12. If desired the filter 98 may be formed from a tight mesh material to allow even more impurities to be filtered out.

The filter 98 may be easily removed from the spigot assembly 14 by disengaging the holder 94, together with the filter 98 from the spout portion 88. The filter may be cleaned using conventional methods, such as detergent and water to remove any food particles that may settle on the filter surface when filtering the contents of the container 12.

The food holder 16 may be formed as a plate with a plurality of fluid openings 102 to allow the cooking liquid to reach the food item positioned on the plate. A convenient handle 104 is secured to the plate 106 and extends outwardly therefrom. The handle 104 may be an elongated handle or a loop handle, as shown in FIG. 1, depending on the design. It is preferred that the handle 104 be long enough to allow the handle to extend above the expected level of liquid in the container 12. In this manner, positioning and removing of a food item from the container 12 is facilitated.

In operation, the user fills the container 10 with a cooking liquid to a desired level. The user then positions the food item, such a while bird, on the plate 106 and carefully lowers the plate into the chamber 28, while holding the handle 104. The food is then cooked according to a recipe. After the food-cooked item is removed, the user allows the cooking liquid to cool and then positions a cooking liquid receptacle (not shown) under the spout 84.

The user then opens the valve by rotating the handle 64. The liquid is allowed to move from the drain opening 52 into the valve member 54 and through the opening 70 into the spout 84. The draining liquid carries small solid particles suspended in the liquid. The filter 98 filters these particles. Some of the flaked off seasonings and solid particles will settle on the bottom plate 20 below the spigot assembly 14. The user may slightly tilt the container 12 to get the remainder liquid to flow into the drain opening 52.

A small amount of the liquid, if left in the container 12 may be then disposed of in the usual manner. Since the majority of the liquid has been drained and filtered the small amount that has to be disposed of presents a small loss. Once the liquid has been drained, the user disengages the holder 94 and removes the filter 98 for cleaning.

Any particles trapped in the spout 84 are removed by disengaging the spout from the spigot assembly 14. The spout 84 may be washed under running water or soaked in soapy water to remove any settled particles. If desired, the valve member 54 may be also removed for cleaning by disengaging the valve member from the coupler 56.

The filter 98 may be changed as frequently as necessary to ensure proper filtration of the solid burnt particles. If desired the collected drained oil may be further filtered with the help of a finer filtration device. The drained oil may be then re-used. If reuse of oil is not practical, the oil may be easily dispose of without the need to lift the heavy container with oil. Any oil remaining in the container 12 may then be easily removed.

Many changes and modifications may be made in the design of the present invention without departing from the spirit thereof. I, therefore, pray that my rights to the present invention be limited only by the scope of the appended claims.

I claim:

1. A cooking vessel, comprising:

a container having a bottom plate and a cylindrical continuous side wall extending upwardly from said bottom plate, said side wall being provided with a drain opening a distance above said bottom plate; a food support plate for positioning food items thereon and removal of food items from within the containers; and a spigot assembly attached to the side wall in fluid communication with said drain opening, said spigot assembly comprising an attachment member secured to the side wall, said attachment member having a first portion that is fixedly attached to and surrounds said drain opening on an exterior surface of said side wall and a second portion extending through said first portion into said drain opening without contacting said side wall, said spigot assembly facilitating a fluid communication between an interior of said container and an exterior thereof to allow draining of liquid from said container, said spigot assembly further comprising a valve member detachably secured to said attachment member and a spout member detachably secured to an outlet end of said valve member, said spout member carrying a filter assembly to facilitate filtering of liquids being drained from said container.

2. The apparatus of claim 1, wherein said first portion of the attachment member has a circumferential edge that conforms to the configuration of the cylindrical wall of the container, said circumferential edge being fixedly attached to the exterior surface of said side wall, said second portion of the attachment member having an exterior diameter smaller than the diameter of the drain opening of said container.

\* \* \* \* \*